(12) United States Patent
Rossey et al.

(10) Patent No.: US 9,033,839 B2
(45) Date of Patent: May 19, 2015

(54) DIRECT DRIVE TRANSMISSION DECOUPLER

(71) Applicant: Magna E-Car Systems of America, Inc., Rochester Hills, MI (US)

(72) Inventors: Michel Paul Rossey, Rochester, MI (US); Edward A. Vaughan, Rochester, MI (US)

(73) Assignee: Magna E-Car Systems of America, Inc., Rochester Hills, MI (US)

( * ) Notice: Subject to any disclaimer, the term of this patent is extended or adjusted under 35 U.S.C. 154(b) by 0 days.

(21) Appl. No.: 13/674,116

(22) Filed: Nov. 12, 2012

(65) Prior Publication Data

US 2014/0135169 A1  May 15, 2014

(51) Int. Cl.
| | | |
|---|---|---|
| *F16H 48/30* | (2012.01) | |
| *B60K 1/00* | (2006.01) | |
| *B60K 17/02* | (2006.01) | |
| *B60K 17/356* | (2006.01) | |
| *B60K 23/08* | (2006.01) | |
| *B60W 10/02* | (2006.01) | |
| *B60K 17/16* | (2006.01) | |

(52) U.S. Cl.
CPC .................. *B60W 10/02* (2013.01); *B60K 1/00* (2013.01); *B60K 17/02* (2013.01); *B60K 17/165* (2013.01); *B60K 17/356* (2013.01); *B60K 23/08* (2013.01); *B60K 2001/001* (2013.01); *Y10T 477/322* (2015.01)

(58) Field of Classification Search
USPC ..................................................... 475/150, 5
See application file for complete search history.

(56) References Cited

U.S. PATENT DOCUMENTS

| | | | |
|---|---|---|---|
| 4,660,669 A * | 4/1987 | Shimizu ......................... | 180/444 |
| 5,620,387 A * | 4/1997 | Janiszewski .................. | 475/150 |
| 6,008,606 A * | 12/1999 | Arai et al. ..................... | 318/431 |
| 6,378,638 B1 | 4/2002 | Mizon et al. | |
| 6,401,850 B1 | 6/2002 | Bowen | |
| 6,435,296 B1 * | 8/2002 | Arai .............................. | 180/243 |
| 6,540,035 B2 * | 4/2003 | Nagano et al. ............. | 180/65.21 |
| 6,604,591 B2 | 8/2003 | Bowen et al. | |
| 7,024,290 B2 | 4/2006 | Zhao et al. | |
| 7,223,191 B2 * | 5/2007 | Aikawa et al. ................ | 475/200 |
| 8,095,288 B2 | 1/2012 | Bruns et al. | |
| 8,140,230 B2 | 3/2012 | Haggerty et al. | |
| 8,195,352 B2 | 6/2012 | Morris | |
| 8,403,088 B2 * | 3/2013 | Knoblauch et al. .......... | 180/65.7 |
| 8,499,868 B2 * | 8/2013 | Fuechtner et al. ........... | 180/65.7 |
| 8,556,760 B2 * | 10/2013 | Mack et al. ................... | 475/152 |
| 2002/0019284 A1 | 2/2002 | Aikawa | |
| 2005/0109549 A1 | 5/2005 | Morrow | |
| 2009/0160274 A1 | 6/2009 | Aikawa et al. | |
| 2009/0211824 A1 | 8/2009 | Knoblauch et al. | |
| 2010/0087996 A1 | 4/2010 | Haggerty et al. | |
| 2011/0094806 A1 | 4/2011 | Mack et al. | |
| 2011/0218070 A1 | 9/2011 | Mack et al. | |
| 2012/0158233 A1 * | 6/2012 | Makino .......................... | 701/22 |

* cited by examiner

*Primary Examiner* — Dirk Wright
(74) *Attorney, Agent, or Firm* — Dickinson Wright PLLC

(57) ABSTRACT

An electric drive module for use in electric vehicles includes an electric traction motor, a geared reduction unit driven by the electric motor, a differential unit interconnecting a pair of axleshafts to a pair of wheels, and a disconnect mechanism for selectively coupling and uncoupling the geared reduction unit and the differential unit. The disconnect mechanism is configured to normally couple the geared reduction unit to the differential unit. The disconnect mechanism uncouples the geared reduction unit from the differential unit to prevent peak torque transients and torque reversals between the electric motor and the wheels.

20 Claims, 8 Drawing Sheets

DIRECT DRIVE TRANSMISSION DECOUPLER

FIELD

The present disclosure relates generally to vehicles that are powered at least partly by an electric drive module having an electric traction motor and a final drive assembly and, more particularly, to an electric drive module with a disconnect mechanism for selectively decoupling the final drive assembly from the electric traction motor.

BACKGROUND

This section provides background information related to the present disclosure which is not necessarily prior art.

The automobile industry is actively working to develop alternative powertrains in an effort to significantly reduce or eliminate the emissions exhausted into the air by conventional powertrains equipped with an internal combustion engine. Significant development has been directed toward electric vehicles (EV) that are equipped with one or more electric traction motors. For example, some electric vehicles are only powered by the electric motor(s) and rely solely on the electrical energy stored in an on-board battery pack. However, some other electric vehicles, commonly referred to as hybrid electric vehicles (HEV), have both an internal combustion engine and one or more traction motors.

There are two types of hybrid electric vehicles, namely, series hybrid and parallel hybrid. In series hybrid electric vehicles, tractive power is generated and delivered to the wheels by the electric traction motor(s) while the internal combustion internal combustion engine is used to drive a generator for charging the battery pack. In parallel hybrid electric vehicles, the traction motor(s) and the internal combustion engine work independently or in combination to generate and deliver tractive power to the wheels.

In some of the electric and hybrid electric vehicles mentioned above, an electric drive module (EDM) is used to generate and deliver tractive power to a pair of wheels. The electric drive module may include an electric traction motor, a final drive assembly including a differential unit that is adapted for connection to the wheels, and a reduction gearset directly coupling an output component of the traction motor to an input component of the differential unit. The reduction gearset may be based on a layshaft configuration or a planetary configuration for the purpose of providing a desired speed reduction and torque multiplication between the traction motor and the differential unit. Thus, the electric drive module is essentially a single-speed or "direct drive" transaxle that can be adapted to drive either the front wheels or the rear wheels of the vehicle.

In conventional vehicles, some type of torque modulator or torque damper is used, such as a clutch or a torque converter, to dampen the torque transfer between the powertrain and the wheels. However, in vehicles equipped with an electric drive module, the wheels and the drivetrain are always coupled together. As such, the electric drive module must be engineered to withstand the large torque transients and torque reversals that are anticipated to occur during braking events and/or in response to the vehicle travelling over severe road conditions. During these events, the rotary components of the reduction gearset and the electric motor are subjected to unmatched wind-up velocities induced by the wheels which can cause torque loads that are significantly larger than the maximum torque produced by the electric motor. To avoid damage, the components of the electric drive module must be sized to accommodate such excessive peak loading conditions, thereby increasing mass and cost. In addition, adaptive motor control algorithms may need to be implemented into the control system associated with the electric drive module to assist in counteracting the mismatch in torque loads and directions.

In view of the above, it would be beneficial to provide technology that addresses and overcomes these issues so as to facilitate the design and manufacturer of electric drive modules for electric and hybrid electric vehicles having optimized mass and sizing characteristics as well as improved operational functionality.

SUMMARY

This section provides a general summary of the disclosure, and is not a comprehensive disclosure of its full scope or all of its features.

According to an aspect of the disclosure, an electric drive module for a vehicle is disclosed. The vehicle may include a pair of wheels, a battery and a vehicle control system. The electric drive module comprises an electric motor, a geared reduction unit driven by the electric motor, a final drive assembly adapted to be drivingly connected to the wheels, and a disconnect mechanism which is operable to selectively couple and uncouple the geared reduction unit and the final drive assembly. The disconnect mechanism may include a clutch that is operably disposed between the geared reduction unit and the final drive assembly. The disconnect mechanism may also include a power-operated actuator for selectively engaging and disengaging the clutch, and a disconnect control module for controlling actuation of the power-operated actuator.

The final drive assembly may further include a differential unit and a pair of axleshafts interconnecting the differential unit to the wheels. The disconnect mechanism is configured to selectively couple and uncouple the geared reduction unit and the differential unit.

The electric drive module may be configured as a single-axis assembly having the electric motor, the geared reduction unit and the differential unit aligned for rotation about a common rotary axis. The geared reduction unit may include a planetary gearset driven by the electric motor and which is selectively coupled and uncoupled to the differential unit by the disconnect mechanism.

The electric drive module may be configured as a two-axis assembly having the differential unit and the electric motor aligned for rotation about a first rotary axis and the geared reduction unit aligned for rotation about a second rotary axis offset relative to the first rotary axis. The geared reduction unit may include a layshaft gearset driven by the electric motor and which is selectively coupled and uncoupled to the differential unit by the disconnect mechanism.

The electric drive module may be configured as a three-axis assembly having the electric motor aligned for rotation about a first rotary axis, the geared reduction unit aligned for rotation about a second rotary axis, and the differential unit aligned for rotation about a third rotary axis. The geared reduction unit may include a layshaft gearset driven by the electric motor and which is selectively coupled and uncoupled to the differential unit by the disconnect mechanism.

In accordance with another aspect of the present disclosure, the disconnect mechanism may comprise an electro-mechanical assembly wherein the clutch includes a dog clutch and the power-operated actuator includes a shift mechanism for moving the dog clutch between first and second positions. The dog clutch is operable in its first position to couple the geared reduction unit to the differential unit and is further operable in its second position to decouple the geared reduction unit from the differential unit. The shift mechanism may include an electric motor or a solenoid capable of receiving command signals from the disconnect control module for controlling movement of the dog clutch between its first and second positions.

In accordance with a further aspect of the present disclosure, the disconnect mechanism may comprise an electro-hydraulic assembly wherein the clutch includes a dog clutch and the power-operated actuator includes a hydraulic system capable of generating pressurized fluid within a hydraulic circuit for moving the dog clutch between first and second positions. The dog clutch is operable in its first position to couple the geared reduction unit to the differential unit and is further operable in its second position to decouple the geared reduction unit from the differential unit. The hydraulic system may include an electrically-operated fluid pump capable of receiving command signals from the disconnect control module for regulating the hydraulic fluid pressure within a pressure chamber that is used to control movement of the dog clutch between its first and second positions.

In accordance with yet another aspect of the present disclosure, the disconnect mechanism may comprise an electro-magnetic assembly wherein the clutch includes a dog clutch and the power-operated actuator includes an electromagnetic actuator operable for moving the dog clutch between first and second positions. The dog clutch is operable in its first position to couple the geared reduction unit to the differential unit and is further operable in its second position to decouple the geared reduction unit from the differential unit. The electromagnetic actuator may include a spring-loaded power-off device for normally locating the dog clutch in its first position. Energization of the electromagnetic actuator based on command signals from the disconnect control module causes the dog clutch to move to its second position.

In accordance with another aspect of the present disclosure, the disconnect mechanism may comprise a wet friction clutch assembly wherein the clutch includes a multi-plate clutch pack and the power-operated actuator is operable to control the magnitude of a clutch engagement force applied to the multi-plate clutch pack. The multi-plate clutch pack may be preloaded to couple the geared reduction unit to the differential unit and define a coupled state. The power-operated actuator is operable to reduce the magnitude of the clutch engagement force to permit slip across the multi-plate clutch pack and define a decoupled state. The power-operated actuator controls the magnitude of the clutch engagement force based on command signals from the disconnect control module and may include electro-mechanical, electro-hydraulic or electro-magnetic actuation devices.

In accordance with another aspect of the present disclosure, the disconnect mechanism may include a multi-plate torque-limiting clutch assembly operably disposed between the geared reduction unit and the differential unit. The torque-limiting clutch assembly may be configured to only permit slip across the multi-plate clutch pack when a torque transient exceeds a predetermined preload applied to the clutch pack so as to decouple the geared reduction unit from the differential unit.

In accordance with these and other aspects of the present disclosure, the disconnect control module may receive one or more signals or messages from sensors associated with the vehicle. The vehicle control system may provide these sensor signals to the disconnect control module. In turn, the disconnect control module may command operation of the disconnect mechanism based on one or more of these sensor signals. One non-limiting sensor signal that can be used by the disconnect control module to control actuation of the disconnect mechanism includes a status change of an anti-locking brake system (ABS) between active and inactive states. The disconnect control module can be configured to actuate the disconnect mechanism for decoupling the geared reduction unit from the differential unit when the ABS changes from an inactive state to an active state and subsequently cause the geared reduction unit to be coupled to the differential unit when the ABS status returns to its inactive state.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure is generally related to integration of an electric traction motor and a single-speed gearbox into an electric drive module (EDM) which is adapted for use in electric vehicles (EV) or hybrid electric vehicles (HEV) for generating and delivering tractive power (i.e., drive torque) to a pair of ground-engaging wheels. Integration of the electric traction motor and the gearbox into a common housing permits use of the electric drive module as an axle drive system that can be configured to replace an otherwise conventional axle assembly. Accordingly, several exemplary embodiments of electric drive modules will hereinafter be described in sufficient detail to permit those skilled in the art to comprehend and appreciate the enhanced structural and functional features and operational characteristic associated with the teachings of the present disclosure.

Figure 1:
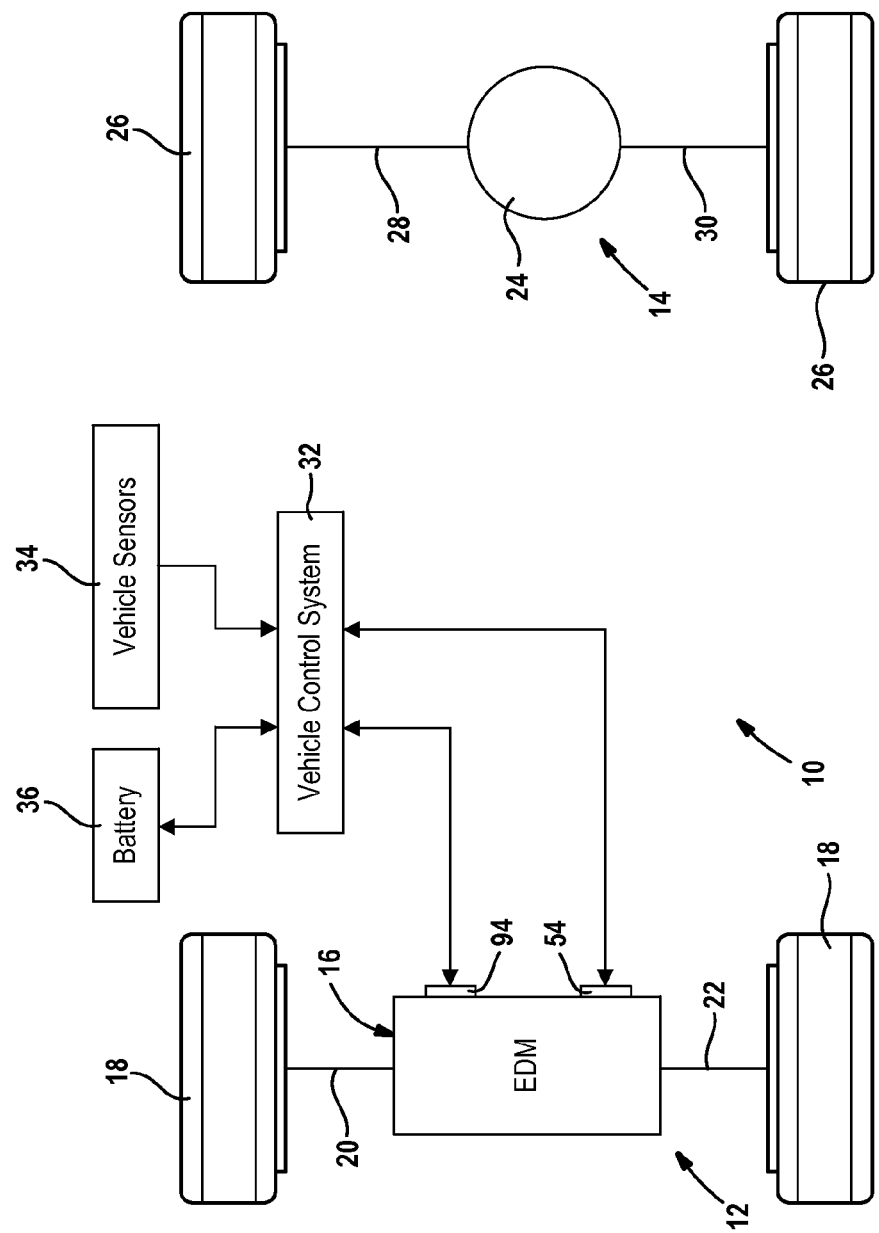
FIG. 1 is a schematic illustration of a powertrain and control system associated with an electric vehicle that is equipped with an electric drive module constructed in accordance with the teachings of the present disclosure.

Referring initially to FIG. 1, an exemplary powertrain arrangement for an electric vehicle 10 is shown to include a first powered driveline assembly 12 and a second non-powered driveline assembly 14. First driveline assembly 12 includes an electric drive module (EDM) 16 which is operatively coupled to drive or be driven by a pair of first ground-engaging wheels 18 via a pair of first axleshafts 20 and 22. Second driveline assembly 14 may include an axle assembly having a differential unit 24 operatively coupled to a pair of second ground-engaging wheels 26 via a pair of second axleshafts 28 and 30. In accordance with the present teachings, powered driveline assembly 12 may be arranged as either the front or rear driveline of electric vehicle 10. Electric vehicle 10 is also shown to include a vehicle control system 32, a set of vehicle sensors 34 and a battery pack 36, all of which will be described in greater detail hereinafter.

Figure 2:
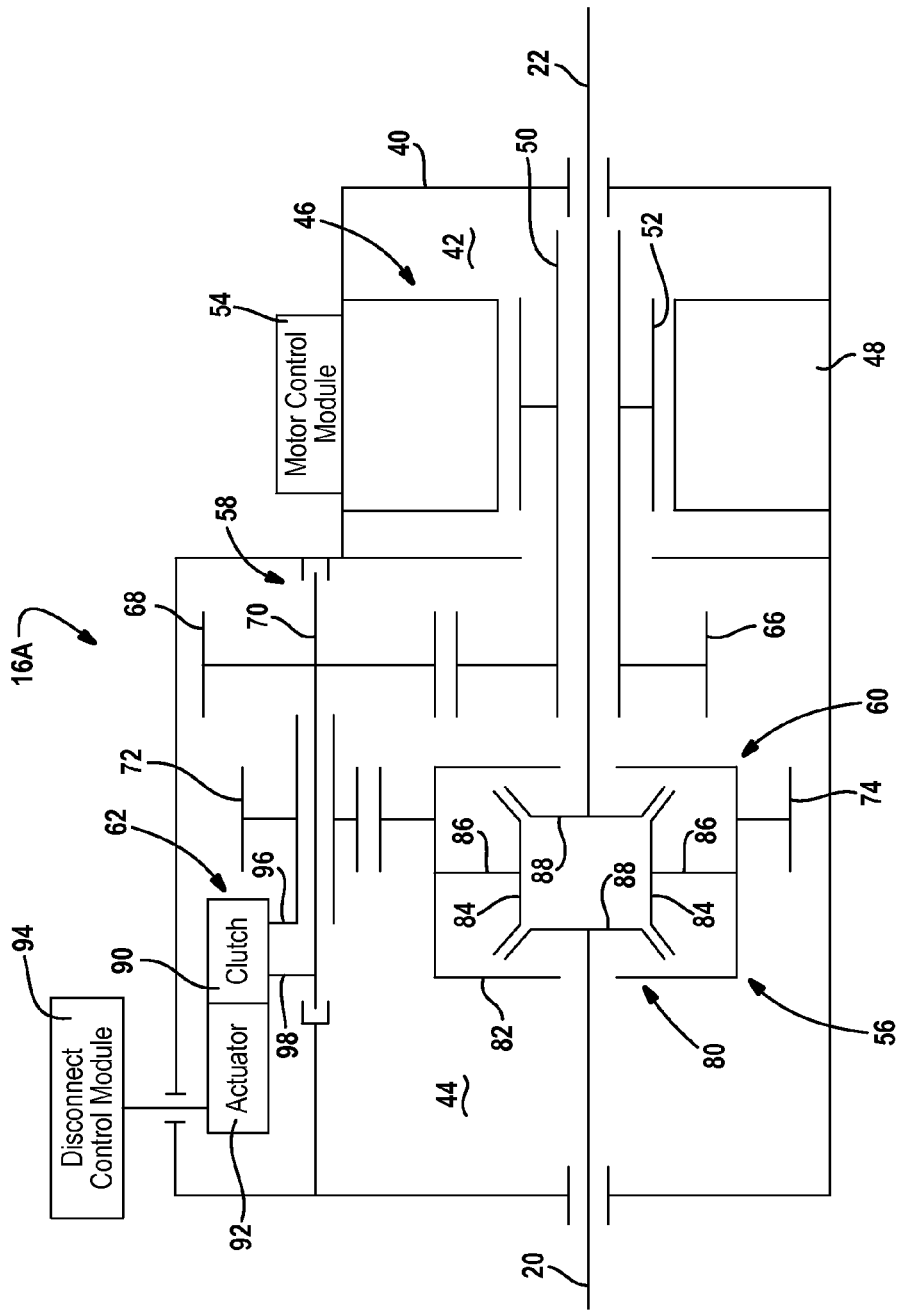
FIG. 2 is a schematic view of an electric drive module adapted for use with the electric vehicle shown in FIG. 1.

Referring to FIG. 2, a first exemplary construction for electric drive module 16 of FIG. 1 is schematically shown an identified by reference numeral 16A. EDM 16A includes a housing 40 defining a motor chamber 42 and a gearbox chamber 44. An electric traction motor 46 is located within motor chamber 42 and includes a stator 48 non-rotatably secured to housing 40 and an elongated tubular rotor shaft 50 that is rotatably supported by housing 40. Motor assembly 46 further includes a rotor 52 fixed for rotation with rotor shaft 50. EDM 16A is also shown to include a motor control module 54 that is in communication with vehicle control system 32 and functions to control actuation of electric motor 46.

Rotor shaft 50 is coupled either directly or indirectly (i.e., via a collar) to an input component of a gearbox assembly 56 located within gearbox chamber 44. Gearbox assembly 56 includes a geared reduction unit 58, a final drive assembly 60, and a disconnect mechanism 62. Geared reduction unit 58 is configured as a layshaft arrangement and is adapted to provide a ratio reduction from rotor shaft 50 to axleshafts 20 and 22. Geared reduction unit 58 includes an input gear 66 fixed for rotation with rotor shaft 50 and which is meshed with a first reduction gear 68 that is fixed for rotation with a transfer shaft 70. Transfer shaft 70 is rotatably supported by housing 40 within gearbox chamber 44. Geared reduction unit 58 further includes a second reduction gear 72 rotatably mounted on transfer shaft 70 and which is meshed with an output gear 74.

Final drive assembly 60 includes a differential unit 80 having a differential case 82, a pair of pinion gears 84 rotatably mounted on pinion shafts 86 that are fixed to differential case 82, and a pair of output gears 88 that are each meshed with both pinion gears 84. Output gears 88 are shown to be fixed for rotation with axleshafts 20 and 22 for drivingly interconnecting differential unit 80 to wheels 18. It will be also noted that output gear 74 of geared reduction unit 58 is fixed for rotation with differential case 82. Thus, differential case 82 acts as an input member to differential unit 80 while output gears 88 act as its output members. Those skilled in the art will recognize that differential unit 80 could be replaced with a planetary-type differential capable of transmitting torque from its input member to its output members while permitting speed differentiation therebetween.

Disconnect mechanism 62 is shown to generally include a clutch 90, a power-operated actuator 92, and a disconnect control module 94. Clutch 90 is shown to be operably disposed between a first clutch member 96 fixed to second reduction gear 72 and a second clutch member 98 fixed to transfer shaft 80. Clutch 90 is operable in a first or "coupled" mode to connect second reduction gear 72 for rotation with transfer shaft 70 and establish a drive connection between electric motor 46 and differential unit 80. With clutch 90 in its coupled mode, rotary power can be transferred between electric motor 46 and wheels 18 of electric vehicle 10. Clutch 90 is also operable in a second or "uncoupled" mode to disconnect second reduction gear 72 from transfer shaft 70 and release the drive connection between electric motor 46 and differential unit 80. With clutch 90 in its uncoupled mode, no rotary power is transferred between electric motor 46 and wheels 18 of electric vehicle 10.

Power-operated actuator 92 is arranged and configured to shift clutch 90 between its coupled and uncoupled modes in response to command signals from disconnect control module 94. Disconnect control module 94 is in communication with vehicle control system 32 and vehicle sensors 34. Those skilled in the art will also recognize that motor control module 54 and disconnect control module 94 can be integrated into a common gearbox control module associated with EDM 16A if desired.

Figure 3:
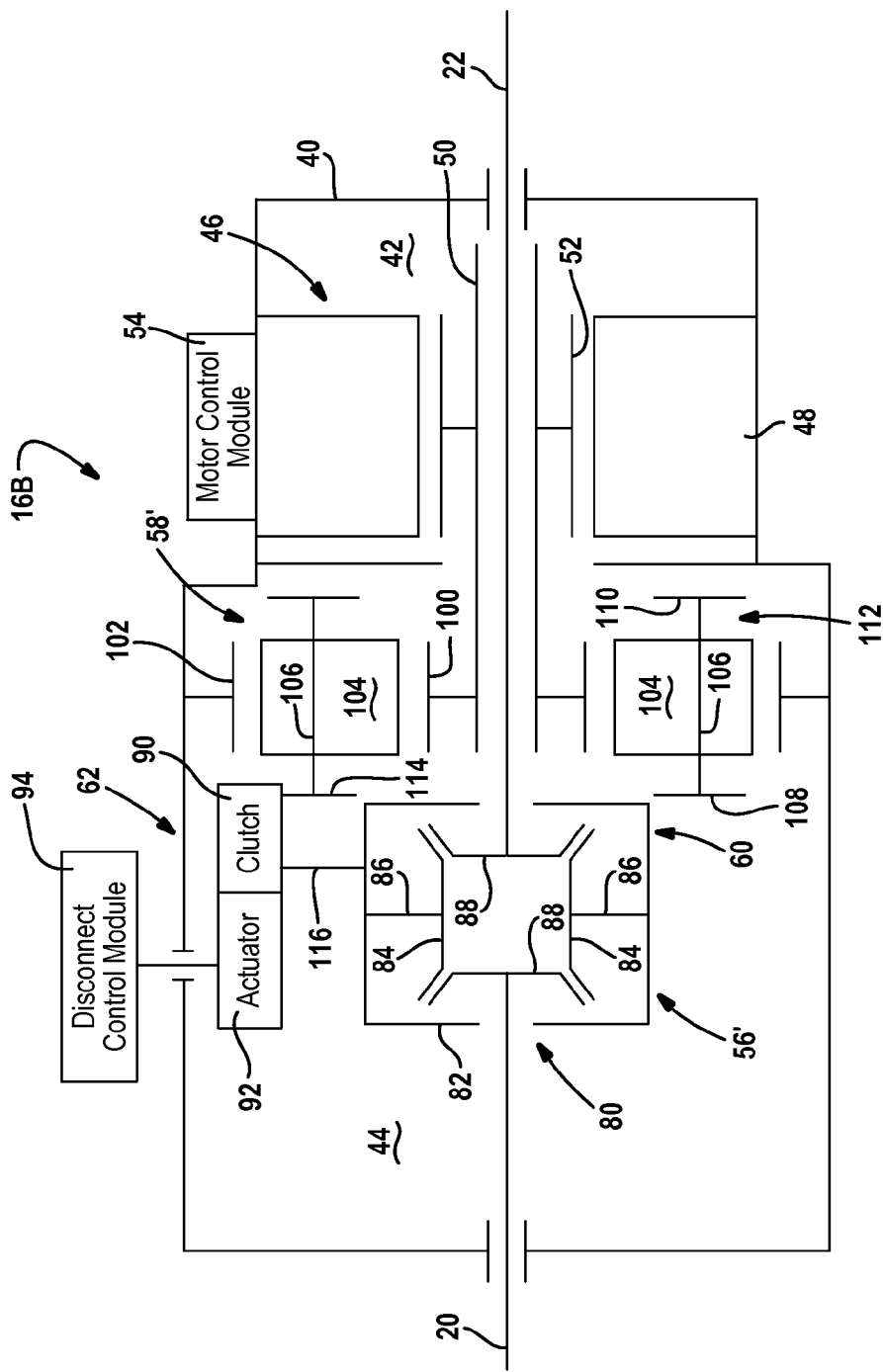
FIG. 3 is a schematic view of an electric drive module in accordance with an alternative construction.

Referring now to FIG. 3, a second exemplary construction for electric drive module 16 of FIG. 1 is schematically shown and identified by reference numeral 16B. In general, EDM 16B is similar to EDM 16A with the exception that the layshaft type of geared reduction unit 58 associated with gearbox assembly 56 shown in FIG. 2 has been replaced with a gearbox assembly 56' having a planetary type of geared reduction unit 58'. Geared reduction unit 58' is shown to include a sun gear 100 fixed for rotation with rotor shaft 50, a ring gear 102 non-rotatably fixed to housing 40, and a plurality of planet gears 104 that are meshed with both sun gear 100 and ring gear 102. Planet gears 104 are rotatably supported on planet posts 106 that extend between a first carrier plate 108 and a second carrier plate 110 of a planet carrier 112. Those skilled in the art will recognize that other planetary gearsets may be employed for geared reduction unit 58' such as, for example, those having compound planet gears.

Clutch 90 is shown to be operably disposed between a first clutch member 114 fixed to (or integral with) first carrier plate 108 of planet carrier 112 and a second clutch member 116 fixed to differential case 82 of differential unit 80. Clutch 90 is operable in a first or coupled mode to connect planet carrier 112 to differential case 82 of differential case 80. With clutch 90 in its coupled mode, rotary power can be transferred between electric motor 46 and wheels 18 of electric vehicle 10. Clutch 90 is also operable in a second or uncoupled mode for disconnecting planet carrier 112 from differential case 82 and releasing the drive connection between electric motor 46 and wheels 18 of electric vehicle 10. Power-operated actuator 92 is again operable to shift clutch 90 between its coupled and uncoupled modes in response to command signals from disconnect control module 94.

Figure 4:
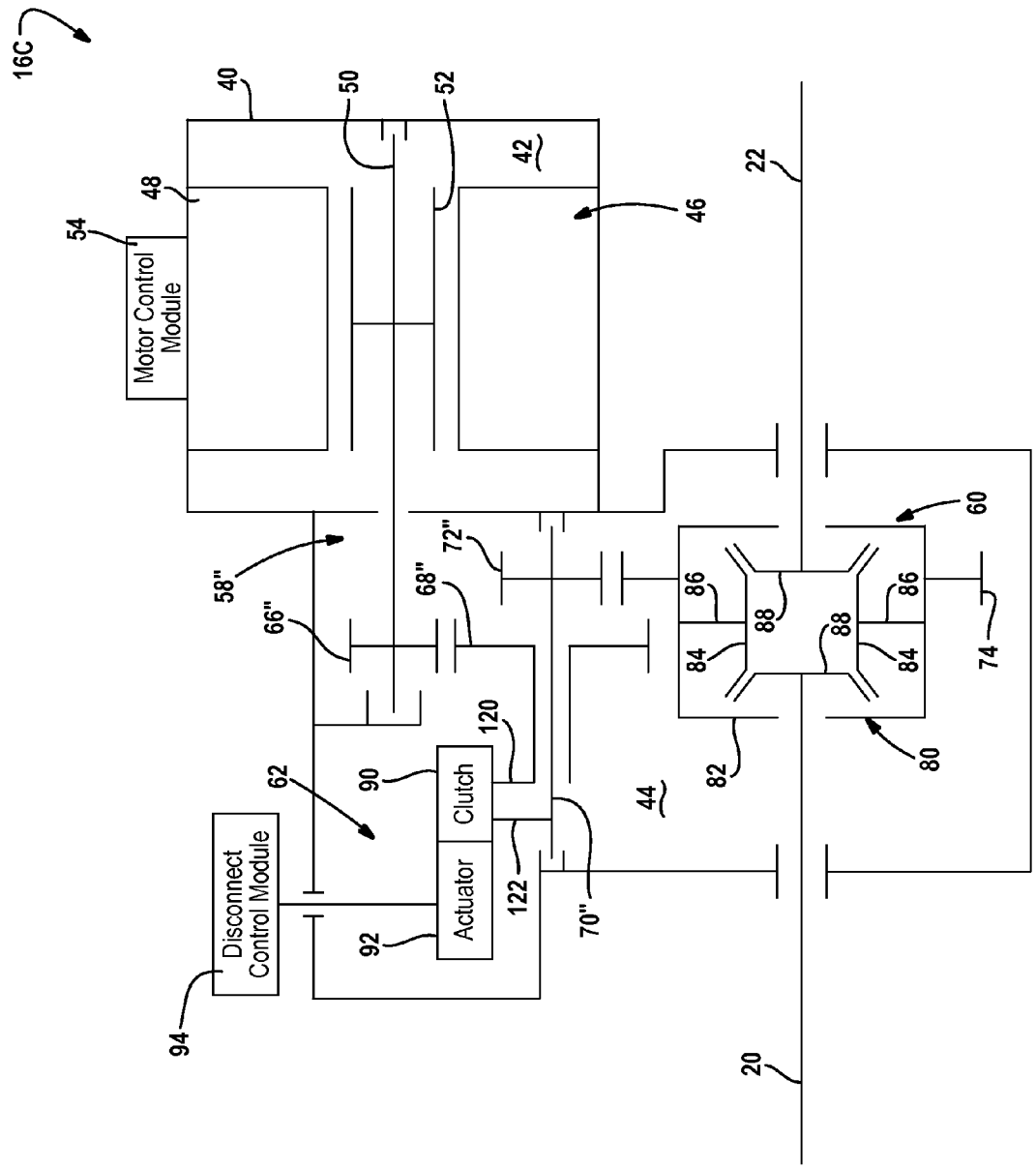
FIG. 4 is a schematic view of an electric drive module in accordance with another alternative construction.

Referring now to FIG. 4, a third exemplary construction for electric drive module 16 of FIG. 1 is schematically shown and identified by reference numeral 16C. In general, EDM 16C is similar to EDM 16A of FIG. 2 with the exception that electric motor 46 is offset from the rotary axis of differential unit 80 to define a three-axis arrangement. In particular, gearbox assembly 56" includes a geared reduction unit 58", final drive assembly 60, and disconnect mechanism 62. Geared reduction unit 58" is configured as a layshaft arrangement having a transfer shaft 70'" rotatably supported in gearbox chamber 44 between rotor shaft 50 and differential unit 80. Geared reduction unit 58" includes an input gear 66" fixed for rotation with rotor shaft 50 and which is meshed with a first reduction gear 68" that is rotatably supported on transfer shaft 70". Geared reduction unit 58" also includes a second reduction gear 72" that is fixed for rotation with transfer shaft 70". Second reduction gear 72" is meshed with output gear 74 which is fixed for rotation with differential case 82.

Disconnect mechanism 62 is shown to include clutch 90, power-operated actuator 92 and disconnect control module 94. Clutch 90 is operably disposed between a first clutch member 120 fixed to first reduction gear 68" and a second clutch member 122 fixed to transfer shaft 70". Clutch 90 is operable in a first or coupled mode to connect first reduction gear 68" to transfer shaft 70" and establish a drive connection between electric motor 46 and differential unit 80. With clutch 90 in its coupled mode, rotary power can be transferred between electric motor 46 and wheels 18 of electric vehicle 10. Clutch 90 is also operable in a second or uncoupled mode to disconnect first reduction gear 68" from transfer shaft 70" and release the drive connection between electric motor 46 and differential unit 80. With clutch 90 in its uncoupled mode, no rotary power can be transferred between electric motor 46 and wheels 18 of electric vehicle 10. Power-operated actuator 92 is operable to shift clutch 90 between its coupled and uncoupled mode in response to command signals from disconnect control module 94.

Each of the alternative versions of electric drive module 16 shown in FIGS. 2 through 4 is equipped with a disconnect mechanism 62 comprised of clutch 90, power-operated actuator 92 and disconnect control module 94. Referring now to FIGS. 5 through 8, various arrangements for disconnect mechanism 62 are shown that are specifically adapted for use in EDM 16A of FIG. 2. However, it is understood that each of the disconnect mechanism configurations shown in FIGS. 5-8 are equally applicable to EDM 16B of FIG. 3 and EDM 16C of FIG. 4 for establishing the coupled and uncoupled modes of operation.

Figure 5:
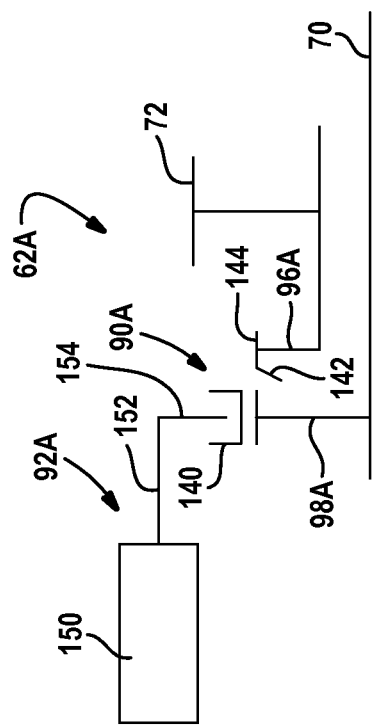
FIG. 5 illustrates an electro-mechanical disconnect mechanism that can be operably associated with the electric drive modules of FIGS. 2-4.

Referring to FIG. 5, an exemplary construction for clutch 90 and power-operated actuator 92 of disconnect mechanism 62 is schematically shown and identified by reference numeral 62A. In particular, disconnect mechanism 62A is an electro-mechanical assembly with the clutch defining a dog clutch 90A and the power-operated actuator defining an electrically-powered shift mechanism 92A. The first clutch member defines a clutch ring 96A that is fixed to, or formed on, second reduction gear 72 while the second clutch member defines a clutch hub 98A that is fixed to, or formed on, transfer shaft 70. Dog clutch 90A includes a shift sleeve 140 that is splined for bi-directional translational movement on clutch hub 98A, a synchronizer 142 disposed between clutch hub 98A and clutch ring 96A, and clutch teeth 144 formed on clutch ring 96A. Shift sleeve 140 is shown in a neutral position displaced from engagement with clutch teeth 144 on clutch ring 96A so as to define the uncoupled mode of clutch 90A. With shift sleeve 140 in its neutral position, second reduction gear 72 is released from driven connection with transfer shaft 70. Actuation of shift mechanism 92A in response to a command signal from disconnect control module 94 will cause shift sleeve 140 to be moved axially from the neutral position shown to a locked position. In its locked position, shift sleeve 140 engages clutch teeth 144 and drivingly connects clutch ring 96A to clutch hub 98A so as to establish the coupled mode of clutch 90A.

Synchronizer 142 is operable to assist in smooth engagement of shift sleeve 140 with clutch teeth 144 on clutch ring 96A by facilitating speed synchronization between transfer shaft 70 and second reduction gear 72. In addition, motor control module 54 can be used to assist in "matching" the rotary speeds of transfer shaft 70 and second reduction gear 72 by monitoring the rotary speed of rotor shaft 50 and the rotary speed of one of differential case 82 and/or axleshafts 20, 22. Accordingly, a smooth engagement of clutch 90A is established upon movement of shift sleeve 140 from its neutral position into its locked position. Furthermore, motor control module 54 may be programmed to maintain the rotary speed of rotor shaft 50 in synchronization with the relative rotary speed of the wheels 18 at all times, regardless of whether clutch 90A is operating in its coupled or uncoupled mode.

Shift mechanism 92A may include an electrically-powered device 150 and a mechanical device 152 that cooperate to move shift sleeve 144 between its neutral and locked positions in response to command signals from disconnect control module 94. Electrically-powered device 150 may include an electric motor while mechanical device 152 functions to convert the rotary output of the electric motor into translational movement of shift sleeve 140. Some examples of such rotary-to-linear conversion devices that are contemplated for use with mechanical device 152 may include ballramps, leadscrews, ballscrews and the like. Mechanism device 152 is shown to include a shift fork 154 seated in an annular groove in shift sleeve 140 to facilitate the translational movement of shift sleeve 140. It is also contemplated that electric-powered device 150 may include a solenoid device or other type of linear actuator capable of causing mechanical device 152 to move shift sleeve 140 axially between its neutral and locked positions.

Figure 6:
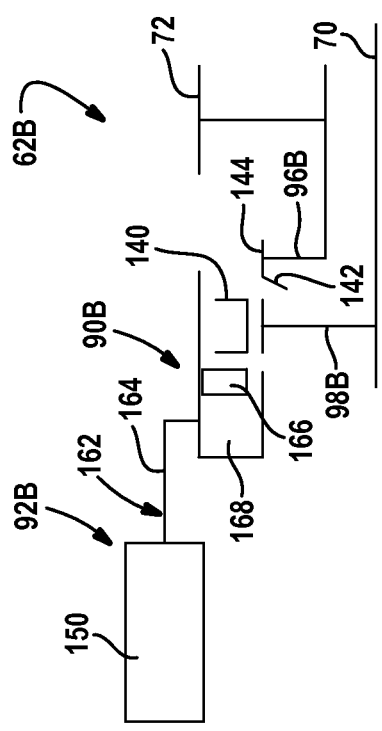
FIG. 6 illustrates an electro-hydraulic disconnect mechanism that can be operably associated with the electric drive modules of FIGS. 2-4.

Referring to FIG. 6, another exemplary construction for clutch 90 and power-operated actuator 92 of disconnect mechanism 62 is schematically shown and identify ed by reference numeral 62B. In particular, disconnect mechanism 62B is an electro-hydraulic assembly with the clutch defining a dog clutch 90B and the power-operated actuator defining a hydraulic shift mechanism 92B. The first clutch member defines a clutch ring 96B that is fixed to, or formed on, second reduction gear 72 while the second clutch member defines a clutch hub 98B that is fixed to, or formed on, transfer shaft 70. Dog clutch 90B includes shift sleeve 140 that is splined for bi-directional translational movement on clutch hub 98B, synchronizer 142 and clutch teeth 144 formed on clutch ring 96B. Shift sleeve 140 is shown in its neutral position released from engagement with clutch ring 96B to define the uncoupled mode of dog clutch 90B. With shift sleeve 140 in its neutral position, second reduction gear 72 is released from driven connection with transfer shaft 70. Actuation of hydraulic shift system 92B will cause shift sleeve 140 to move from its neutral position to its locked position whereat shift sleeve 140 engages teeth 144 on clutch ring 96B and drivingly connects clutch ring 96B to clutch hub 98B to establish the coupled mode of dog clutch 90B.

Hydraulic shift mechanism 92B may include an electrically-power device 160 and a hydraulic fluid device 162 that cooperate to move shift sleeve 140 between its neutral and locked positions in response to command signals from disconnect control module 94. Electrically-powered device 160 may include a motor-driven fluid pump while hydraulic fluid device 162 may include a hydraulic circuit 164 between the fluid pump and a piston 166 disposed in a pressure chamber 168. Regulation of the fluid pressure with chamber 168 will control the position of piston 166 relative to shift sleeve 140 and control movement of shift sleeve 140 between its neutral and closed positions.

Figure 7:
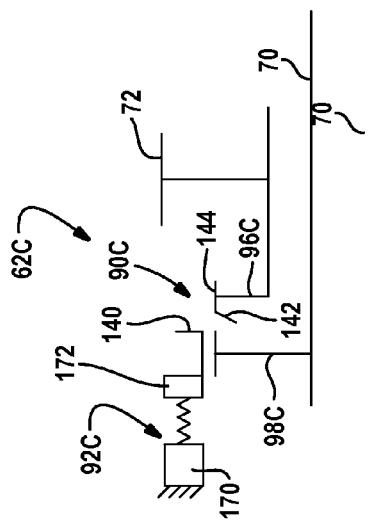
FIG. 7 illustrates an electro-magnetic disconnect mechanism that can be operably associated with the electric drive modules of FIGS. 2-4.

Referring to FIG. 7, another exemplary construction for clutch 90 and power-operated actuator 92 associated with disconnect mechanism 62 is schematically shown and identified by reference numeral 62C. In particular, disconnect mechanism 62C is an electro-magnetic assembly with the clutch defining a dog clutch 90C and the power-operated actuator defining an electromagnetic shift mechanism 92C. Dog clutch 90C includes shift sleeve 140 that is axially moveable on clutch hub 98C between a neutral position released from engagement with clutch teeth 144 on clutch ring 96C and a locked position coupling clutch ring 96C for rotation with clutch hub 98C.

Electromagnetic shift mechanism 92C may include a stationary core 170 and a moveable armature plate 172 that is fixed to shift sleeve 140. A spring 174 normally urges armature plate 172 to locate shift sleeve 140 in its locked position when core 170 is not energized. Upon energization of core 170 by disconnect control module 94, armature plate 172 is magnetically drawn toward core 170, in opposition to the biasing of spring 174, for moving shift sleeve 140 out of its locked position and into its neutral position shown.

Figure 8:
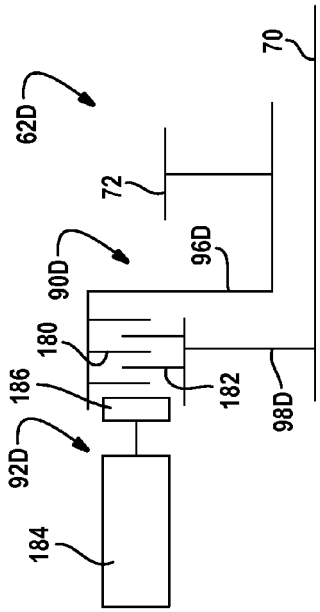
FIG. 8 illustrates a friction clutch disconnect mechanism adapted for use with the electric drive modules of FIGS. 2-4.

Referring to FIG. 8, yet another exemplary construction for clutch 90 and power-operated actuator 92 associated with disconnect mechanism 62 is schematically shown and identified by reference numeral 62D. In particular, disconnect mechanism 62D is a friction clutch assembly defining a multi-plate clutch 90D and a shift mechanism 92D. The first clutch member is a clutch drum 96D fixed for rotation with second reduction gear 72. The second clutch member is a clutch hub 98D fixed for rotation with transfer shaft 70. Multi-plate clutch 90D includes a clutch pack of interleaved clutch plates including outer plates 180 splined for rotation with drum 96D and inner plates 182 splined for rotation with hub 98D. Shift mechanism 92D can include an electrically or hydraulically powered device 184 capable of controlling the axial position of a piston or pressure plate 186 relative to interleaved clutch plates 180, 182 so as to regulate the magnitude of a clutch engagement force exerted by piston 186 thereon. The uncoupled mode for clutch 90D is established when the magnitude of the clutch engagement force exerted on the clutch pack is below a predetermined threshold level so as to permit relative rotation (i.e., slip) between the outer and inner clutch plates. In contrast, the coupled mode for clutch 90D is established when shift mechanism 184 exerts a clutch engagement force exceeding the predetermined threshold level so as to couple second reduction gear 72 for rotation with transfer shaft 70 through frictional engagement of the clutch pack. It is contemplated that shift mechanism 184 can be similar to any of the arrangements shown in FIGS. 5, 6 and 7 when configured to control the position of piston 184 instead of shift sleeve 140.

Figure 9:
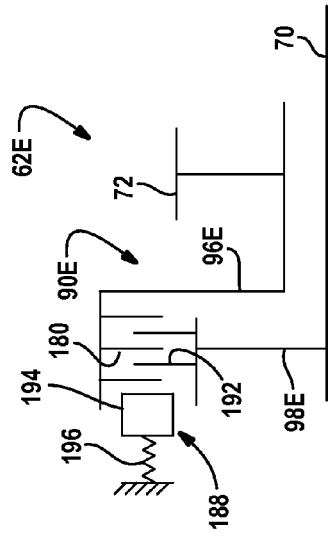
FIG. 9 illustrates a torque-limiting clutch disconnect mechanism adapted for use with the electric drive modules of FIGS. 2-4.

The disconnect mechanism arrangements described above with reference to FIGS. 5 through 8 are all configured to utilize a command from disconnect control module 94 to adaptively control the location/position of a clutch engagement component. In contrast, FIG. 9 illustrates a passively controlled disconnect mechanism 62E having its clutch defined by a multi-plate friction clutch 90E and a preloaded torque-limiting device 188. The first clutch member is a clutch drum 96E while the second clutch member is a clutch hub 98E. A clutch pack of outer plates 190 and inner plates 192 are interleaved and splined to drum 95E and hub 98E, respectively. The torque limiting device 188 includes an apply plate 194 that is biased by a spring-loading device 196 to exert a preload force on the clutch pack. The magnitude of the preload force is selected to normally maintain frictional engagement of the clutch pack, thereby creating a frictional connection between second reduction gear 72 and transfer shaft 70 under most operational conditions. Clutch 90E only shifts into its uncoupled mode when a peak transient torque or torque reversal occurs which causes slip between the interleaved clutch plates in opposition to the preload applied by spring biasing device 196. Upon removal of the excessive torque load condition, spring-biasing device 196 automatically returns clutch 90E to its normally coupled mode of operation. A preload in the range of about 110% to 130% of the maximum torque generated by motor 46 of EDM 16 can provide the desired passive torque limiting function for clutch 90E.

Figure 10:
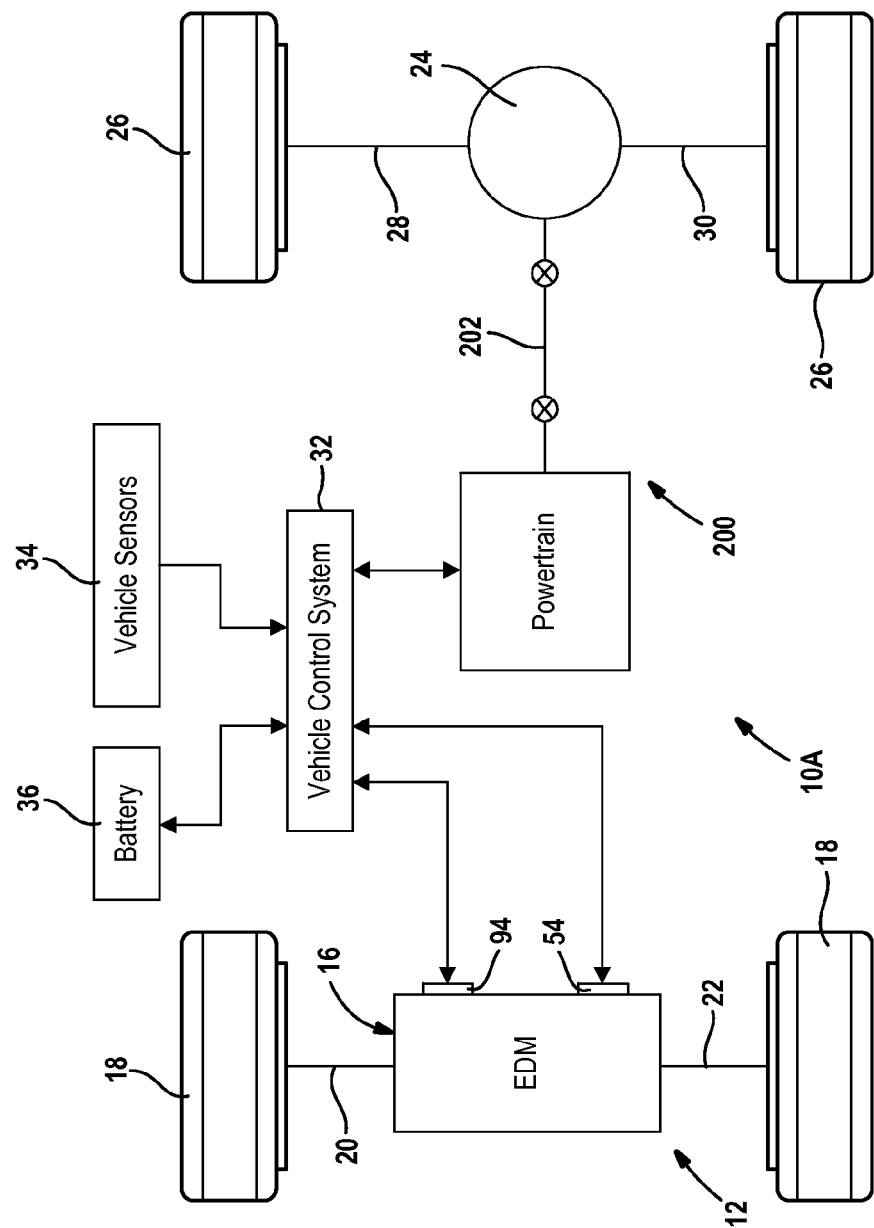
FIGS. 10 and 11 are schematic illustrations of powertrains and control systems associated with hybrid electric vehicles equipped with the electric drive modules of the present disclosure.
Figure 11:
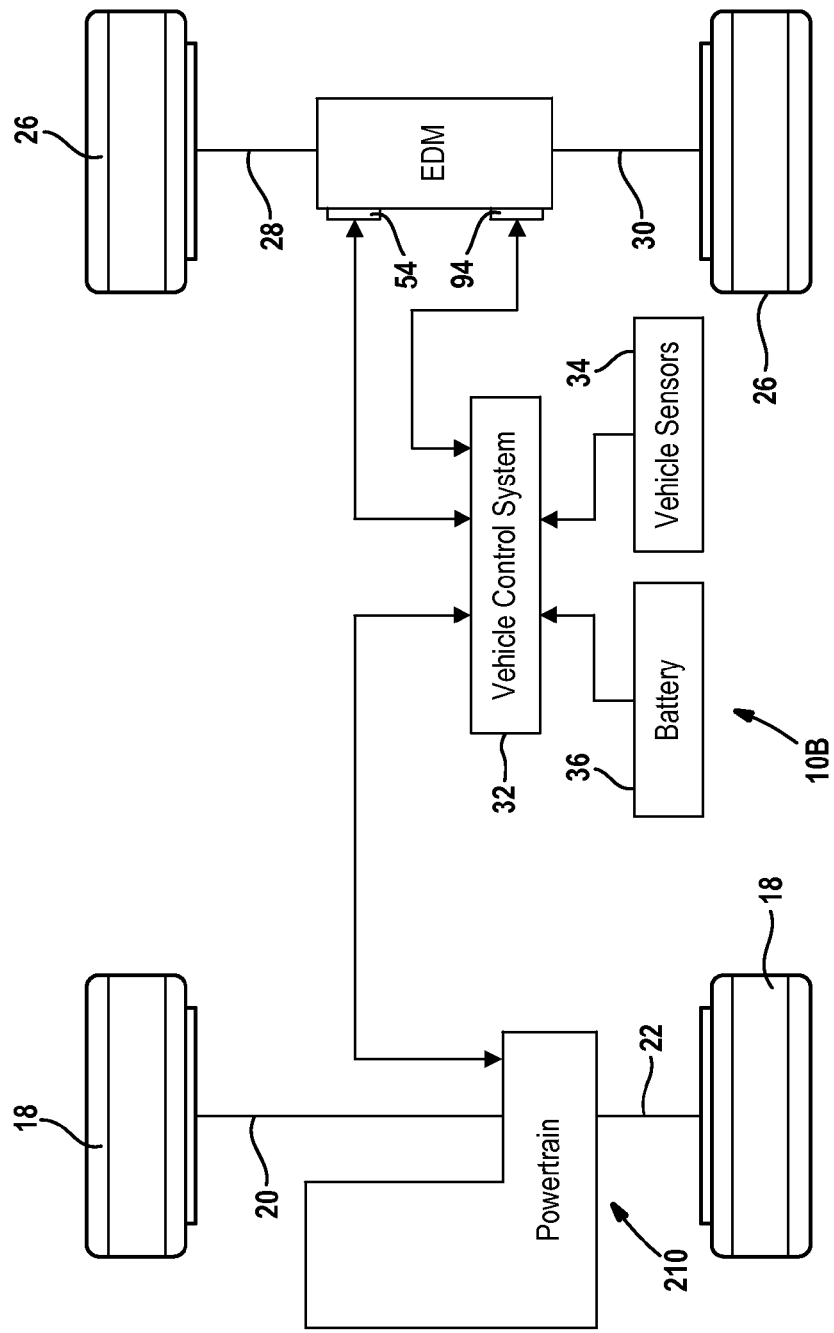

While electric drive module 16 has been described for use with electric vehicle 10, it is contemplated that electric drive module 16 can also be readily adapted for use with hybrid electric vehicles. To this end, FIGS. 10 and 11 illustrate parallel hybrid electric vehicles having a conventional powertrain integrated into the vehicle to provide supplemental tractive power to the pair of second wheels 26. Specifically, FIG. 10 illustrates a hybrid electric vehicle 10A similar to electric vehicle 10 of FIG. 1 but further including a conventional powertrain 200 configured to drive differential 24 via a propshaft 202 for delivering drive torque to second wheels 26. In contrast, FIG. 11 illustrates a hybrid electric vehicle 10B having electric drive module 16 configured to drive second wheels 26 while a conventional powertrain 210 is configured to drive first wheels 18.

As noted, the present disclosure is directed to providing a disconnect mechanism in an electric drive module to permit a decoupling of the wheel torque generated by the ground-engaging wheels and the motor torque generated by the traction motor. Integration of disconnect mechanism 62 into electric drive module 16 permits the loads exerted on the gearbox assembly 56 due to changes in the rotational velocity of the wheels during braking to be eliminated or substantially reduced. In accordance with one control strategy, disconnect control module 94 can receive sensor signals or messages from the vehicle's on-board network (i.e., CAN or LIN) that are indicative of the status of the ABS from an ABS module associated with vehicle sensors 34. Specifically, disconnect control module 94 can be programmed to monitor the ABS active/inactive status message broadcast from the ABS module.

During normal operation of the vehicle, disconnect mechanism 62 would maintain clutch 90 in its coupled mode to permit the transmission of torque between electric motor 46 and wheels 18 for driving vehicle 10 and/or regeneration of electrical power to recharge battery 36. However, upon detection that the ABS signal has changed from its inactive status to its active status, power-operated actuator 92 is commanded to shift clutch 90 into its uncoupled mode, thereby disconnecting gearbox assembly 56 from electric motor 46. When the ABS signals subsequently return to its inactive status, clutch 90 is shifted back into its coupled mode. Additionally, during operation of clutch 90 in its uncoupled mode, motor control module 54 will monitor wheel speeds and the motor speed to assist in speed synchronization for smooth re-engagement of clutch 90.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric drive module for driving a pair of wheels in a vehicle, comprising:
    a pair of axleshafts adapted for connection to the pair of wheels;
    an electric motor having a rotor shaft;
    a differential unit connected to said pair of axleshafts;
    a geared reduction unit driven by said rotor shaft;
    a disconnect mechanism for selectively coupling and uncoupling said geared reduction unit and said differential unit, said disconnect mechanism including a clutch and a power-operated actuator for actuating said clutch, wherein said clutch is operably disposed between said geared reduction unit and said differential unit and is operable in a first mode to establish a drive connection between said geared reduction unit and said differential unit and in a second mode to release said drive connection between said geared reduction unit and said differential unit, and wherein said power-operated actuator is operable for shifting said clutch between its first and second modes; and
    a disconnect control module for controlling actuation of said power-operated actuation in response to a sensor signal associated with an operational characteristic of the vehicle, wherein said sensor signal is an ABS status signal, and wherein said disconnect control module commands said power-operated actuator to shift said clutch into its first mode when said ABS status signal indicates an inactive status and commands said power-operated actuator to shift said clutch into its second mode when said ABS status signal indicates an active status.

2. The electric drive module of claim 1 wherein said geared reduction unit includes an input gear driven by said rotor shaft, a transfer shaft having a first reduction gear fixed thereon that is in meshed engagement with said input gear, and a second reduction gear rotatably supported on said transfer shaft and driving an input member of said differential unit, and wherein said clutch is operably disposed between said transfer shaft and said second reduction gear, said clutch is operable in its first mode to couple said second reduction gear for rotation with said transfer shaft and in its second mode to uncouple said second reduction gear from said transfer shaft.

3. The electric drive module of claim 2 wherein said clutch includes a first clutch member fixed to said second reduction gear, a second clutch member fixed to said transfer shaft, and an axially slideable shift sleeve, wherein said first mode of said clutch is established when said shift sleeve is located in a first position for coupling said first and second clutch members and said second mode of said clutch is established when said shift sleeve is located in a second position for uncoupling said first and second clutch members.

4. The electric drive module of claim 3 wherein said power-operated actuator is an electro-mechanical assembly operable for moving said shift sleeve between its first and second positions in response to a command signal from said disconnect control module.

5. The electric drive module of claim 3 wherein said power-operated actuator is an electro-hydraulic assembly operable for moving said shift sleeve between its first and second position in response to a command signal from said disconnect control module.

6. The electric drive module of claim 3 wherein said power-operated actuator is an electro-magnetic assembly, wherein said shift sleeve is normally biased into its first position by a biasing spring and said electro-magnetic assembly is operable to move said shift sleeve to its second position in response to a command signal from said disconnect control module.

7. The electric drive module of claim 2 wherein said clutch includes a multi-plate clutch pack disposed between said second reduction gear and said transfer shaft and a moveable pressure plate for applying a clutch engagement force on said clutch pack, wherein said power-operated actuator is operable to regulate the magnitude of said clutch engagement force applied by said pressure plate to said clutch pack, wherein said first mode of said clutch is established when the magnitude of said clutch engagement force exceeds a first predetermined value to couple said second reduction gear for rotation with said transfer shaft, and wherein said second mode of said clutch is established when the magnitude of said clutch engagement force is less than a second predetermined value to permit said second reduction gear to rotate relative to said transfer shaft.

8. The electric drive module of claim 7 wherein said power-operated actuator is an electro-mechanical assembly operable for moving said pressure plate relative to said clutch pack in response to a command signal from said disconnect control module.

9. The electric drive module of claim 7 wherein said power-operated actuator is an electro-hydraulic assembly operable for moving said pressure plate relative to said clutch pack in response to a command signal from said disconnect control module.

10. The electric drive module of claim 1 wherein said pair of axleshafts, said rotor shaft and said differential unit are disposed for rotation about a first rotary axis, wherein said geared reduction unit is a layshaft arrangement disposed for rotation about a second rotary axis that is offset relative to said first rotary axis and having a transfer shaft driven by said rotor shaft and a transfer gear driving said differential unit, and wherein said clutch is operable for selectively coupling and uncoupling said transfer gear and transfer shaft.

11. The electric drive module of claim 1 wherein said pair of axleshafts, said rotor shaft, said differential unit, and said geared reduction unit are disposed for rotation about a first rotary axis, wherein said geared reduction unit is a planetary gearset having an input component driven by said rotor shaft, and an output component driven at a reduced speed relative to said input component, and wherein said clutch is operable for selectively coupling and uncoupling said output component of said planetary gearset and said differential unit.

12. The electric drive module of claim 1 wherein said rotor shaft is disposed for rotation about a first rotary axis, wherein said pair of axleshafts and said differential unit are disposed for rotation about a second rotary axis, wherein said geared reduction unit is disposed for rotation about a third rotary axis and includes a transfer shaft driven by said rotor shaft and a transfer gear driving said differential unit, and wherein said clutch is operable for selectively coupling and uncoupling said transfer shaft and said transfer gear.

13. An electric drive module for driving a pair of wheels in a vehicle, comprising:
    a pair of axleshafts adapted for connection to the pair of wheels;
    an electric motor having a rotor shaft;
    a differential unit connected to said pair of axleshafts;
    a geared reduction unit driven by said rotor shaft;
    a disconnect mechanism for selectively coupling and uncoupling said geared reduction unit and said differential unit, said disconnect mechanism including a clutch and a power-operated actuator for actuating said clutch, wherein said clutch is operably disposed between said geared reduction unit and said differential unit and is operable in a first mode to establish a drive connection between said geared reduction unit and said differential unit and in a second mode to release said drive connection between said geared reduction unit and said differential unit, and wherein said power-operated actuator is operable for shifting said clutch between its first and second modes; and a disconnect control module for controlling actuation of said power-operated actuation in response to a sensor signal associated with an operational characteristic of the vehicle;

wherein said geared reduction unit is a planetary gearset having a fixed ring gear, a sun gear driven by said rotor shaft, a planet carrier, and planet gears rotatably supported by said planet carrier and that are meshed with said ring gear and said sun gear, and wherein said clutch;

wherein said clutch is operably disposed between said planet carrier and an input member of said differential unit, said clutch including a first clutch member fixed to said planet carrier, a second clutch member fixed to said input member of said differential unit, and an axially slideable shift sleeve, wherein said first mode of said clutch is established when said shift sleeve is located in a first position for releaseably coupling said first and second clutch members and said second mode of said clutch is established when said shift sleeve is located in a second position for uncoupling said first and second clutch members.

14. The electric drive module of claim 13 wherein said power-operated actuator is an electro-mechanical assembly operable for moving said shift sleeve between its first and second positions in response to a command signal from said disconnect control module.

15. The electric drive module of claim 13 wherein said power-operated actuator is an electro-hydraulic assembly operable for moving said shift sleeve between its first and second position in response to a command signal from said disconnect control module.

16. The electric drive module of claim 13 wherein said power-operated actuator is an electro-magnetic assembly, wherein said shift sleeve is normally biased into its first position by a biasing spring and said electro-magnetic assembly is operable to move said shift sleeve to its second position in response to a command signal from said disconnect control module.

17. An electric drive module for driving a pair of wheels in a vehicle, comprising:
a pair of axleshafts adapted for connection to the pair of wheels;
an electric motor having a rotor shaft;
a differential unit connected to said pair of axleshafts;
a geared reduction unit driven by said rotor shaft;
a disconnect mechanism for selectively coupling and uncoupling said geared reduction unit and said differential unit, said disconnect mechanism including a clutch and a power-operated actuator for actuating said clutch, wherein said clutch is operably disposed between said geared reduction unit and said differential unit and is operable in a first mode to establish a drive connection between said geared reduction unit and said differential unit and in a second mode to release said drive connection between said geared reduction unit and said differential unit, and wherein said power-operated actuator is operable for shifting said clutch between its first and second modes; and a disconnect control module for controlling actuation of said power-operated actuation in response to a sensor signal associated with an operational characteristic of the vehicle;

wherein said geared reduction unit is a planetary gearset having a fixed ring gear, a sun gear driven by said rotor shaft, a planet carrier, and planet gears rotatably supported by said planet carrier and that are meshed with said ring gear and said sun gear, and wherein said clutch; and wherein said clutch is operably disposed between said planet carrier and an input member of said differential unit, said clutch including a multi-plate clutch pack disposed between said planet carrier and said input member of said differential unit and a moveable pressure plate for applying a clutch engagement force on said clutch pack, wherein said power-operated actuator is operable to regulate the magnitude of said clutch engagement force applied by said pressure plate on said clutch pack, wherein said first mode of said clutch is established when the magnitude of said clutch engagement force exceeds a first predetermined value to couple said planet carrier for rotation with said input member of said differential unit, and wherein said second mode of said clutch is established when the magnitude of said clutch engagement force is less than a second predetermined value to permit said planet carrier to rotate relative to said differential unit.

18. The electric drive module of claim 17 wherein said power-operated actuator is an electro-mechanical assembly operable for moving said pressure plate relative to said clutch pack in response to a command signal from said disconnect control module.

19. The electric drive module of claim 17 wherein said power-operated actuator is an electro-hydraulic assembly operable for moving said pressure plate relative to said clutch pack in response to a command signal from said disconnect control module.

20. An electric drive module for driving a pair of wheels, comprising:
a housing defining a motor chamber and a gearbox chamber;
an electric motor mounted in said motor chamber and having a rotor shaft extending into said gearbox chamber;
a gearbox assembly disposed within said gearbox chamber and including a geared reduction unit driven by said rotor shaft, a differential unit interconnecting a pair of axleshafts to the wheels, and a disconnect mechanism for selectively coupling and uncoupling said geared reduction unit and said differential unit; and
a disconnect control module for controlling selective actuation of said disconnect mechanism in response to a sensor signal indicative of an operational characteristic of the vehicle;
wherein said disconnect control module commands said disconnect mechanism into its first mode when said sensor signal indicates an inactive status of the operational characteristic of the vehicle and commands said disconnect mechanism into its second mode when said sensor signal indicates an active status of the operational characteristic of the vehicle.

* * * * *